United States Patent [19]

[11] 3,930,267

Plener

[45] Dec. 30, 1975

[54] PUSH BUTTON RELEASE CONTROL SYSTEM FOR A TAPE RECORDER

[75] Inventor: Helmut Plener, Munich, Germany

[73] Assignee: Uher Werke Munich, Munich, Germany

[22] Filed: Feb. 27, 1974

[21] Appl. No.: 446,285

[30] Foreign Application Priority Data

Sept. 11, 1973 Germany.......................... 2345790

[52] U.S. Cl................................. 360/69; 360/137

[51] Int. Cl.².................................. G11B 15/10

[58] Field of Search................ 360/74, 72, 69, 137; 242/191, 186; 226/33, 43; 197/107; 235/145; 335/159, 160, 164, 165

[56] References Cited

UNITED STATES PATENTS 3,434,725 3/1969 Eibensteiner........................ 360/74

3,488,017 1/1970 Schatteman........................ 242/191

3,754,695 8/1973 Suzuki................................ 360/74

*Primary Examiner*—Robert S. Tupper

*Attorney, Agent, or Firm*—Fleit & Jacobson

[57] ABSTRACT

An electric control circuit for releasing the push button switches in a tape recorder, particularly a cassette recorder, in which tape is advanced off one reel and wound onto another by means of a tape drive. The electric circuit contains a Darlington stage which consists of two transistors and is connected to a cut-off or push button release device. The Darlington stage is maintained non-conducting by means of a control transistor which conducts when the tape is running and actuates the cut-off device when the control transistor is non-conducting as a result of the tape being at a standstill. The cut-off device releases the individually actuated push buttons for the function sequences.

7 Claims, 1 Drawing Figure

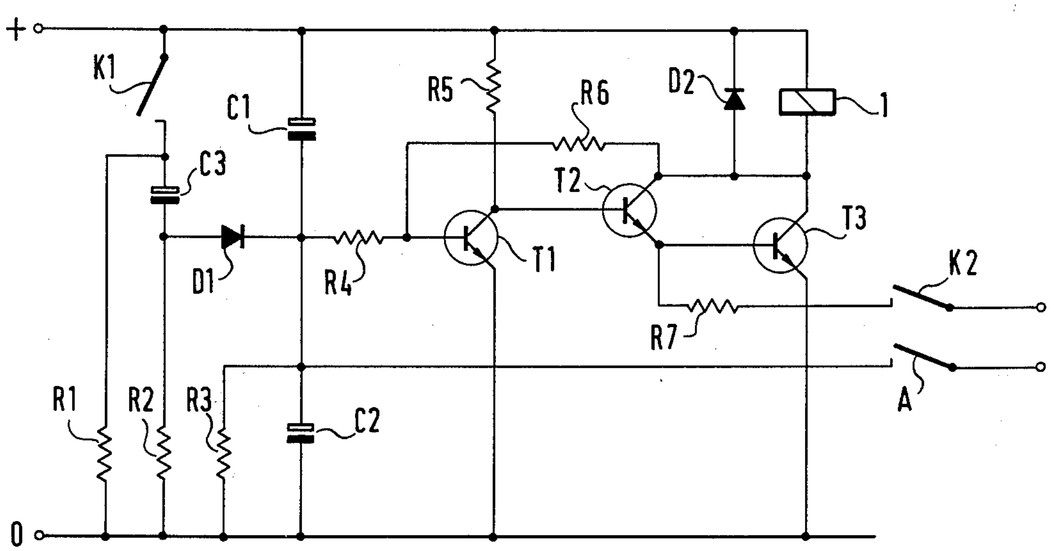
+
K1
C1
R5
R6
D2
1
C3
T2
T3
D1
R4
T1
K2
R7
A
R1
R2
R3
C2
0

PUSH BUTTON RELEASE CONTROL SYSTEM FOR A TAPE RECORDER

The invention relates to an electric control circuit for releasing the push button switches in a tape recorder, particularly a cassette recorder, in which tape is advanced off one reel and wound onto another reel by means of a tape drive.

In a tape recorder, particularly a cassette recorder, we distinguish between various function sequences. Such sequences include the stopping of the tape after the whole tape has once been unwound from one reel and wound onto the other reel. In addition, provision can be made to reverse the tape run direction once, one drive motor being switched off and another drive motor being switched on so that the tape runs back in the opposite direction. At the end of tape rewind, the motor is then switched off so that the tape has been advanced once backwards and forwards between the two reels. In addition, there is also the function sequence of so-called auto-reverse where the tape direction is reversed at each tape end, one motor being switched off and the other motor being switched on again. The tape thus runs continuously to and fro when a so-called auto-reverse operation has been set.

These function sequences can be carried out during so-called normal operation, i.e. when the tape is running slowly for playback or recording, or the tape can be driven quickly, i.e. for rewinding from one reel to the other, this being done at high speed, that is to say high-speed running.

These individual function sequences can be programmed in the recorder by means of pushbuttons. In addition to these pushbuttons for said individual function sequences, pushbuttons can also be provided which determine the tape travelling direction, as well as pushbuttons for "pause" and "start" and "stop".

In a tape recorder, particularly a cassette recorder, it is desirable to initiate and monitor the above-named function sequences with electrical, especially electronic means and not with additional scanning elements and mechanical components. For example, it is known that German application print No. 1,499,944 to provide a cut-off system in a tape recorder for the tape drive, wherein use is made a transistor circuit and of two capacitors which are charged and discharged as a function of the rotation of a tape supply reel and which are so switched into the transistor circuit that the switching device in the tape drive is kept closed as long as the speed of rotation of the tape take-up reel or tape supply reel is still above a certain minimum value. In the known cut-off feature, a capacitor discharge is thus produced constantly via contacts while the reels are turning. Once this circuit has switched off, it is no longer ready to work, which means that it can merely serve at best to stop the tape drive.

The object of the invention is to provide an electric circuit which acts as a push button release to the effect that, when the reels are standing still, for example at the tape end or when the cassette is stopped, all the pushbuttons serving to control the recorder are released and reset to their neutral positions. In addition, the electric circuit is also intended for use as a control circuit for a counter memory.

In the electric circuit of the type named at the beginning, this object is achieved in accordance with the invention in that a Darlington stage consisting of two transistors is connected to a cut-off or push button release system, which stage is held non-conducting by means of a control transistor which conducts when the tape is running and which switches the cut-off system on when the control transistor is non-conducting as a result of the tape being at a standstill, which cut-off system releases the individually actuated buttons for the various function sequences.

The control transistor which maintains the Darlington stage non-conducting when it conducts, can be charged by a pulse generator via a coupling-out capacitor and diode while the tape is running. The pulse generator is designed advantageously as a counter, from the drive wheel of which the pulses are picked up.

The capacitor which serves to determine the time constant while the tape is turning is series-connected with a further capacitor, the capacitance of which preferably amounts to half that of the capacitor named first. The capacitor named last is therefore similarly at the base of said transistor. When the circuit is switched on, positive potential is thus applied momentarily to the base of the transistor. The timeconstant of the two capacitors is so set that the pulses are supplied by the time upon termination of the momentary application of positive potential to the base of the transistor. This prevents the cut-off system, which is preferably a magnet, from tripping too early. In addition, when the pulses are being supplied, the time-constant is determined by the capacitor which keeps that transistor which is connected ahead of the darlington stage, switched through while the tape is running.

The transistors of the Darlington stage can be coupled back via a resistor to the base input of the transistor which is connected ahead of the Darlington stage. This enables the releasing system to be switched exactly. In addition, a diode may also be provided which keeps voltage peaks away from the transistors of the Darlington stage.

A further advantage, which is achieved with released buttons which serve to set the individual function sequences, consists in applying a constant voltage to the capacitor which is connected to a base of the control transistor. This enables the control transistor to stay in a conducting condition, even during a pause.

A further advantage is that the transistors of the Darlington stage can be triggered and held in a conducting condition via a memory button or detent of a counter. When the memory button which is set at a given counter number closes a contact, positive potential is applied to the Darlington stage which is thus put into a conducting condition so that the cut-off system is actuated and the movement of the tape can thus be stopped, too. The reels are then at the position which has been pre-set via the memory button.

The invention is of advantage to the effect that the circuit reverts to its standby position after only a few milliseconds when the Darlington stage has been put into a conducting condition. This means that the function sequences can be changed quickly.

The invention will be explained in greater detail with reference to the attached drawing which represents an embodiment of the invention. The diagram shows an electric circuit which can serve both as a control circuit for detecting the interruption of the advance of the tape and as a control circuit for a counter memory.

The circuit has a Darlington stage consisting of transistors T 2 and T 3. The emitter of transistor T 2 is connected to the base of transistor T 3. The emitter of transistor T 3 is on negative potential. The two collectors of transistors T 2 and T 3 are connected to a cut-off push button release system 1 which may be designed as a tripping magnet.

The collector of a control transistor T 1 is connected to the base of transistor T 2. The emitter of transistor T 1 is similarly on negative potential. The base of transistor T 1 is connected by circuit means to a capacitor C 2 control circuit for detecting the interruption of the advance of the tape. Said capacitor C 2 is series-connected with a capacitor C 1, the capacitance of capacitor C 1 being about half that of capacitor C2.

Over and above that, a resistor R 3 is shunt-connected to capacitor C 2.

Capacitor C 2 can be charged via a coupling-out capacitor C 3 and a diode D 1. A resistor R 2 is series-connected to capacitor C 3 and a resistor R 1 is connected in parallel to coupling-out capacitor C 3.

In addition, a contact K 1 is provided which can be opened and closed by means of a counter drive wheel not shown in further detail.

Further, the collector of transistor T 1 is applied to the supply lead or conductor via a resistor R 5. The collectors of transistors T 2 and T 3 are coupled back to the base of transistor T 1 via a resistor R 6. A series resistor R 4 is furthermore provided between the base of transistor T 1 and capacitor C 2. The collectors of transistors T 2 and T 3 are connected via a diode D 2 with the power conductor "+" thereby providing a bridge across the cut-out or push button release means 1.

In addition, positive potential can also be applied to the emitter of transistor T 2 and the base of transistor T 3 via a resistor when contact K 2 makes. Such contact K 2 can advantageously be released by a memory button or by zero on a counter drive.

In addition, a positive constant voltage which is applied at "pause" is provided at a terminal A for capacitor C 2.

The operation of the represented circuit is as follows.

The circuit shown can be activated by pressing the pushbutton for forward transport of rewind. When the tape runs, contact K 1 is actuated by means of the counter drive wheel which is now shown in further detail; this can be done for example by a cam which is not shown.

However, contact K 1 may also be actuated optically or mechanically. Contact K 1 is actuated once per revolution. As positive potential is applied to one side of contact K 1, positive pulses reach capacitor C 2 via coupling-out capacitor C 3 and diode D 1 and charge C 2.

The voltage prevailing at capacitor C 2 biases transistor T 1 into the conducting condition which in turn maintains the subsequent Darlington stage consisting of transistors T 2 and T 3 in a non-conducting condition.

When the tape is at a standstill, for example at the tape end or when the tape is stopped, contact K 1 does not supply any more pulses. Coupling-out capacitor C 3 is then discharged via resistors R 1 and R 2 and capacitor C 2 is discharged via resistor R 3.

Transistor T 1 becomes non-conducting as a result, and the Darlington stage consisting of transistors T 2 and T 3 becomes conductive, energizing cut-off system 1 which is preferably a tripping magnet.

The tripping magnet 1 releases the respectively pressed pushbuttons which have served to set the function sequence, and puts the entire circuit into the starting condition. The Darlington stage reverts to the neutral position of its own accord, namely within an extremely short interval of about 30 milliseconds.

Resistor R 6 in the feedback circuit makes tripping magnet 1 switch on in a precise manner.

After being switched on, capacitor C 1 causes transistor T 1 to switch through momentarily. As capacitor C 1 has a slight capacitance, i.e. about half the capacitance of capacitor C 2, positive potential is momentarily applied by means of capacitor C 1, at switch-on, to the base of transistor T 1 which is connected ahead of the Darlington stage. The time-constant of the two capacitors C 1 and C 2 is so set that, at the end of the momentary application of positive potential to the base of transistor T 1, the pulses coming from contact K 1 are applied to capacitor C 2. The latter's time-constant is decisive as soon as the tape commences to run.

As soon as the system is at rest, i.e. as soon as the "pause" is set, a constant voltage is applied via contact A to capacitor C 2; this means that transistor T 1 stays in a conducting condition so that tripping magnet 1 is prevented from being released unintentionally.

Contact K 2 can be closed by the memory button of a counter memory or by a counter being reset to zero so that positive potential is applied to the Darlington stage. This positive potential switches the Darlington stage through as it were so that the tape travel can be stopped by means of tripping magnet 1.

The circuit shown can perform various functions, examples including the resetting of all the pushbuttons which serve to set the function sequences of the recorder, or the switch-off the recorder, or the stoppage of the tape in conjunction with a counter or counter memory. The circuit according to the invention can thus assume differing functions.

I claim:

1. A push button release control circuit for a tape recorder such as a cassette recorder in which tape is advanced by drive means between a supply reel and a take-up reel and having a plurality of push button switches selectively movable into operable positions for activating the functional operations of the recorder comprising, in combination, normally inoperative, electrically operated means for releasing all of said push button switches from said operative positions, a pair of transistors interconnected in a Darlington stage for connecting said releasing means to an associated source of power in the conducting condition to operatively condition said releasing means, a control transistor connected to said pair of transistors and to said associated source of power, circuit means connected to said associated source of power for biasing said control transistor into a conducting condition during the advance of said tape to maintain said pair of transistors in a non-conducting condition, said circuit means being responsive to the stopping of said tape to discontinue the biasing of said control transistor and to permit said pair of transistors to conduct for operatively conditioning said releasing means to release all of said push button switches from said operative positions.

2. A push button release control circuit in accordance with claim 1 wherein said circuit means includes a first capacitor connected to the base of said control transistor for biasing said control transistor into a conducting condition and means for charging said first capacitor during the advance of said tape.

3. A push button release control circuit in accordance with claim 2 wherein said means for charging said first capacitor include a second capacitor and a diode connected to said first capacitor and pulse generating means connected to said associated source of power for periodically charging said second capacitor during the advance of said tape.

4. A push button release control circuit in accordance with claim 3 wherein said circuit means includes a third capacitor connected to the base of said control transistor in series relationship with said first capacitor for momentarily biasing said control transistor into a conducting condition prior to the periodic charging of said second capacitor.

5. A push button release control circuit in accordance with claim 4 wherein the capacitance of said third capacitor is approximately one half the capacitance of said second capacitor.

6. A push button release control circuit in accordance with claim 1, including means including a resistor for connecting the collectors of said pair of transistors to the base of said control transistor.

7. A push button release control circuit in accordance with claim 1 including a normally open, manually operated switch connected between said associated source of power and said first capacitor, said manually operated switch being arranged in operative association with one of said push button switches for movement thereby into a closed position for applying a positive biasing voltage to said control transistor to maintain said control transistors in the conducting condition.

* * * * *